US011739851B2

(12) United States Patent
Krieger et al.

(10) Patent No.: US 11,739,851 B2
(45) Date of Patent: Aug. 29, 2023

(54) CLOG RESISTANT APPLIANCE DIVERTER VALVE

(71) Applicant: Illinois Tool Works Inc., Glenview, IL (US)

(72) Inventors: Jeffrey J. Krieger, Mukwonago, WI (US); Jonathan H. Olson, Sussex, WI (US)

(73) Assignee: Illinois Tool Works Inc., Glenview, IL (US)

( * ) Notice: Subject to any disclaimer, the term of this patent is extended or adjusted under 35 U.S.C. 154(b) by 111 days.

(21) Appl. No.: 16/330,299

(22) PCT Filed: Aug. 24, 2017

(86) PCT No.: PCT/US2017/048449
§ 371 (c)(1),
(2) Date: Mar. 4, 2019

(87) PCT Pub. No.: WO2018/048634
PCT Pub. Date: Mar. 15, 2018

(65) Prior Publication Data
US 2019/0203843 A1 Jul. 4, 2019

Related U.S. Application Data

(60) Provisional application No. 62/384,879, filed on Sep. 8, 2016.

(51) Int. Cl.
*F16K 11/085* (2006.01)
*A47L 15/42* (2006.01)
(Continued)

(52) U.S. Cl.
CPC ...... *F16K 11/0856* (2013.01); *A47L 15/4221* (2013.01); *A47L 15/4472* (2013.01);
(Continued)

(58) Field of Classification Search
CPC .... F16K 11/0856; F16K 11/074; F16K 31/04; A47L 15/4472; A47L 15/4221; D06F 33/00; D06F 39/083; D06F 2204/08
See application file for complete search history.

(56) References Cited

U.S. PATENT DOCUMENTS 3,459,208 A * 8/1969 Clyde ................... F16K 31/528
137/119.03
3,504,703 A * 4/1970 Bozoyan ............. F16K 11/0856
137/625.23
(Continued)

FOREIGN PATENT DOCUMENTS

DE 10000772 A1 7/2000
EP 2816270 A2 * 12/2014 ........... F16K 31/043
(Continued)

OTHER PUBLICATIONS

WO-0194039-A1, Computer Translation via IP.com, generated Feb. 13, 2021. (Year: 2021).*
(Continued)

*Primary Examiner* — Duy Vu N Deo
*Assistant Examiner* — Christopher Remavege
(74) *Attorney, Agent, or Firm* — Boyle Fredrickson, S.C.

(57) ABSTRACT

A diverter valve for an appliance having water containing filamentous materials such as hair or string provides a low turbulence conduit (48) interconnecting an inlet (18) and multiple outlets (22a) reducing dead space and opportunities for filamentous materials to catch or collect. The conduit may be contained in a rotating spool (40) within a watertight housing (34) allowing simplified gasketing augmented by an ability to turn on and off waterflow separately, for example, with the valve or pump.

19 Claims, 3 Drawing Sheets

(51) Int. Cl.
*F16K 31/04* (2006.01)
*F16K 11/074* (2006.01)
*D06F 34/08* (2020.01)
*D06F 39/08* (2006.01)
*A47L 15/44* (2006.01)

(52) U.S. Cl.
CPC ............ *D06F 34/08* (2020.02); *D06F 39/083* (2013.01); *F16K 11/074* (2013.01); *F16K 31/04* (2013.01)

(56) References Cited

U.S. PATENT DOCUMENTS

| | | | | |
|---|---|---|---|---|
| 3,762,664 | A * | 10/1973 | Loveless | B65G 51/24 406/182 |
| 4,133,418 | A * | 1/1979 | Van Bilderbeek | E21B 23/12 193/23 |
| 5,848,610 | A | 12/1998 | Livemash et al. | |
| 7,293,435 | B2 * | 11/2007 | Elexpuru | D06F 39/083 68/17 R |
| 7,509,976 | B2 | 3/2009 | McNerney et al. | |
| 7,607,325 | B2 * | 10/2009 | Elexpuru | A47L 15/4221 68/12.18 |
| 8,858,729 | B2 | 10/2014 | Buddharaju et al. | |
| 9,743,822 | B2 * | 8/2017 | Boyer | F16K 31/52483 |
| 9,980,624 | B2 * | 5/2018 | Hofmann | A47L 15/4221 |
| 10,765,291 | B2 * | 9/2020 | Digman | A47L 15/4217 |
| 10,794,500 | B2 * | 10/2020 | Klein | F16K 31/52483 |
| 2002/0179164 | A1 * | 12/2002 | Hashimoto | F16K 31/52416 137/870 |
| 2004/0144431 | A1 | 7/2004 | Yudovsky | |
| 2009/0139553 | A1 * | 6/2009 | Park | A47L 15/4221 251/304 |
| 2017/0071442 | A1 * | 3/2017 | Boyer | F16K 11/074 |
| 2019/0085989 | A1 * | 3/2019 | Klein | F16K 31/52483 |

FOREIGN PATENT DOCUMENTS

| | | | | |
|---|---|---|---|---|
| EP | 3457010 | A1 * | 3/2019 | ........ F16K 31/52483 |
| GB | 928299 | A | 6/1963 | |
| JP | 2000091294 | A | 3/2000 | |
| WO | 0194039 | A1 | 12/2001 | |
| WO | WO-0194039 | A1 * | 12/2001 | ............ F16K 11/074 |

OTHER PUBLICATIONS

EPO Examination Report for Application No. 17 765 292.2 dated Oct. 11, 2020.
International Search Report for PCT/US2017/048449.

* cited by examiner

CLOG RESISTANT APPLIANCE DIVERTER VALVE

CROSS-REFERENCE RELATED APPLICATIONS

This application claims the benefit of provisional application 62/384,879 filed Sep. 8, 2016, and hereby incorporated by reference.

FIELD OF THE INVENTION

The present invention relates to appliances such as heat pump dryers, condensing dryers, clothes washing machines, dishwashers and the like and specifically to a diverter valve that may direct incoming water to a variety of locations in the appliance for activation of special cleaning materials and the like.

BACKGROUND OF THE INVENTION

Modern appliances can provide improved efficiency in water usage and cleaning material usage by timing the introduction of cleaning materials at different points during the cycle. Handling different cleaning materials, such as soaps, bleaches, and softeners, is most conveniently done by preloading the materials into dedicated chambers which are then flushed by the incoming wash water directed through the chamber at specific times. Control of multiple streams of wash water for this purpose can be performed by a diverter valve array typically being multiple electrically driven valves receiving water from a common conduit and directing it along multiple different pathways.

Example diverter valves are described in U.S. Pat. Nos. 8,858,729, 7,509,976, and 5,848,610, all incorporated by reference. U.S. patent application 63/293,988 filed Feb. 11, 2016, assigned to the assignee of the present invention and describing a diverter valve that provides improved performance using a DC motor, is hereby incorporated by reference.

In washing appliance applications, diverter valves may be called upon to recirculate water containing debris such as lint or hair. Such filamentous materials can clog valves that otherwise are capable of conducting highly contaminated water with large particle sizes. Clogging of the diverter valve from these materials can reduce machine efficiency and possibly require expensive service calls to remove clogs that are difficult to access.

SUMMARY OF THE INVENTION

The present inventors have recognized that the problem of filamentous clogging is exacerbated by "dead zones" in the diverter valve such as can create turbulent or stagnant areas where filaments can accumulate or projections that catch filaments despite high flow rates. Accordingly, the Present invention Provides a multi-way diverter valve (for example, providing for different water flow paths) that provides a smooth and continuous flow path through the valve that better resists clogging. In some embodiments, the passageway can provide a constant cross-section minimizing dead zones or minimized angular bending of a type that can catch or retain filaments.

Specifically, in one embodiment, the invention provides an appliance diverter water valve for pumping water having filamentous contaminants, a housing defining an enclosed volume, an inlet channel for receiving water and aligned along an inlet axis, and multiple outlet channels aligned along axes parallel to the inlet axis. A spool positioned in the housing between the inlet channel and the multiple outlet channels rotates about the inlet axis and has a tubular spool channel providing a first end aligned with a proximate end of the inlet channel and a second end aligned with individual proximate ends of the multiple outlets as the spool rotates. An electric motor operating to rotate the spool and a position sensor distinguishes a position of the second end of the spool channel alignment with individual proximate ends of the multiple outlet channels. When the spool channel is aligned with a proximate end of a given outlet channel of the multiple outlet channels, the spool channel provides inner channel Walls that are substantially continuous with inner walls of the inlet channel and inner channel walls of the given outlet channel.

It is thus a feature of one embodiment of the invention to provide a smooth and continuous interconnection between inlets and outlets on the diverter valve resisting clogging by filamentous materials.

The spool channel may be free from bends of 90 degrees or greater and may have a substantially constant cross-sectional area, and in one embodiment the spool channel may be substantially straight.

It is thus a feature of at least one embodiment of the invention to eliminate turbulent flow caused by abrupt changes in channel direction such as may promote snagging or knotting of filamentous material.

The inlet channel may have a circular cross-section and the spool channel may have an cross-section being a projection of the circular cross-section of the inlet channel and multiple outlet channels at an angle of the spool channel.

It is thus a feature of at least one embodiment of the invention to provide a simple miter connection between the inlet and outlet channels permitting a substantially straight spool channel.

The inlet channel and multiple outlet channels may have identical circular cross-sections.

It is thus a feature of at least one embodiment of the invention to minimize velocity changes in the diverter valve such as can create turbulence or dead zones.

The appliance diverter water valve may further include an elastomeric seal rotatably connecting the inlet channel to the spool channel.

It is thus a feature of at least one embodiment of the invention to provide a simple gasketing possible with a rotating rather than sliding joint.

The elastomeric seal may fit within a circular channel centered on the inlet axis and receiving a corresponding circular ridge extending downward from the spool to provide a pivot.

It is thus a feature of at least one embodiment of the invention to provide a functional axis for the spool that does not obstruct the inlet axis.

An upper surface of the spool may abut a plate supporting the multiple outlet channels to provide a sliding seal against the plate with rotation of the spool and the spool may be elastically biased upward into sealing configuration with the plate.

It is thus a feats re of at least one embodiment of the invention to provide a simple sliding interface for the upper joint.

The upper interface between the upper surface of the spool and the plate may be free from elastomeric seals.

It is thus a feature of at least one embodiment of the invention to eliminate the need for complex gasketing.

The spool may include a radially-extending flange deflected upward by a rim on the housing to provide an elastic biasing upward of the spool against the plate in sealing configuration.

It is thus a feature of at least one embodiment of the invention to incorporate an elastic biasing mechanism into the spool without a need for a separate component.

At least a portion of the spool may be substantially cylindrical and may have an outer rim presenting radially-extending gear teeth engaging with a second gear within the housing attached to a motor outside of the housing and having a shaft extending into the housing.

It is thus a feature of at least one embodiment of the invention to provide a drive mechanism that does not obstruct the central axis of the valve along which water flows.

The housing may provide a watertight chamber between the inlet channel and the multiple outlet channels with an opening providing the communication between the motor and the gear sealed by an inter-fitting between a gear shaft and the housing through an elastomeric seal.

It is thus a feature of at least one embodiment of the invention to provide a rotating system that may accommodate some water leakage that will be contained inside of the sealed housing.

The shaft may support a cam outside of the housing interacting with a limit switch to provide to the position sensor.

It is thus a feature of at least one embodiment of the invention to remove electronic components from the housing, the latter of which may then provide a water containment volume.

The motor may be an AC synchronous gear motor.

It is thus a feature of at least one embodiment of the invention to permit use of a robust low-cost AC motor for turning the valve.

The housing, the channel, the multiple outlet channels and the spool may be constructed of a thermoplastic.

It is thus a feature of at least one embodiment of the invention to provide a design that can be constructed solely of thermoplastic materials eliminating components that could rust or stick.

Other features and advantages of the invention will become apparent to those skilled in the art upon review of the following detailed description, claims and drawings in which like numerals are used to designate like features.

Figure 1:
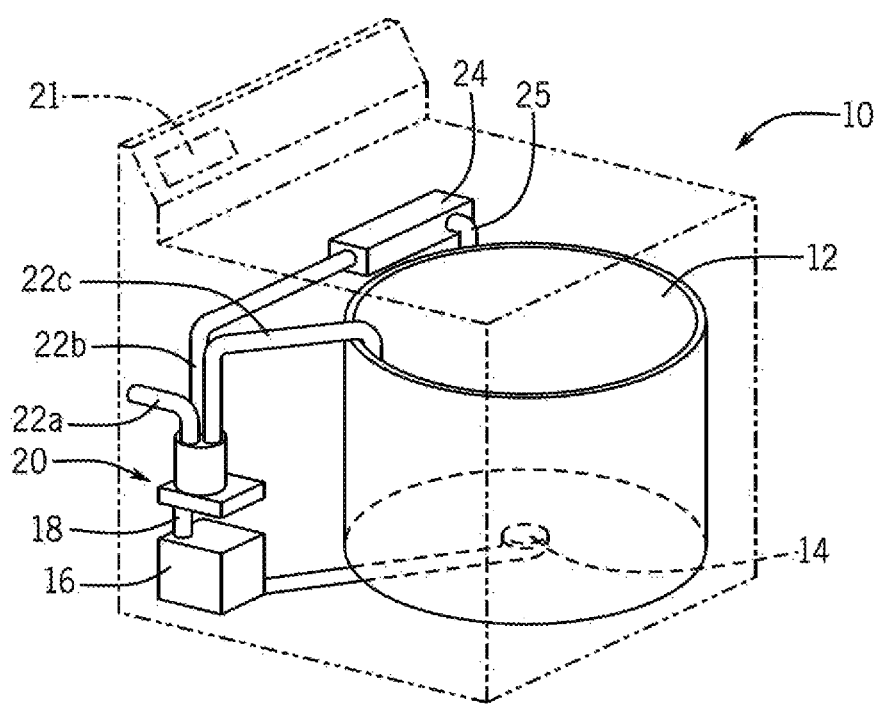
FIG. 1 is a phantom view of a washing machine holding the diverter valve of the present invention for connection to multiple water flow points.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

Referring now to FIG. 1, an appliance 10, such as a top loading washing machine, may provide for a washtub 12 for receiving clothing to be washed therein. Water may be recirculated through the washtub 12 as received by a drain conduit 14 communicating with a bottom of the washtub 12 and passing to a pump 16 that in turn provides water to an inlet pipe 18 of diverter valve 20 of the present invention. Water received by the diverter valve 20 may be directed at different times through various outlet pipes 22a-22c leading respectively to: a discharge drain from the appliance 10, an additive chamber 24, for example, holding detergent or softener and providing an outlet 25 to the washtub 12, or a sprayer or the like returning to washtub 12 optionally through an additional additive chamber. In this way water introduced into the washtub 12 (for example, through a mixer valve, not shown) may be removed, recirculated, or mixed with washing materials by control of the diverter valve 20. This control of the diverter valve 20 may be by an appliance controller 21, for example, communicating with user controls, a cycle timer, and/or various sensors in the appliance 10.

The invention contemplates that the appliance 10 may be a general appliance for washing items including but not limited to other types of washing machines for washing clothing including frontloading washing machines, combination dryer and washing machines, heat pump dryers and dishwashers where diversion of water flow may be desired subject to possible clogging from filamentous material such as hair or string or the like.

Figure 2:
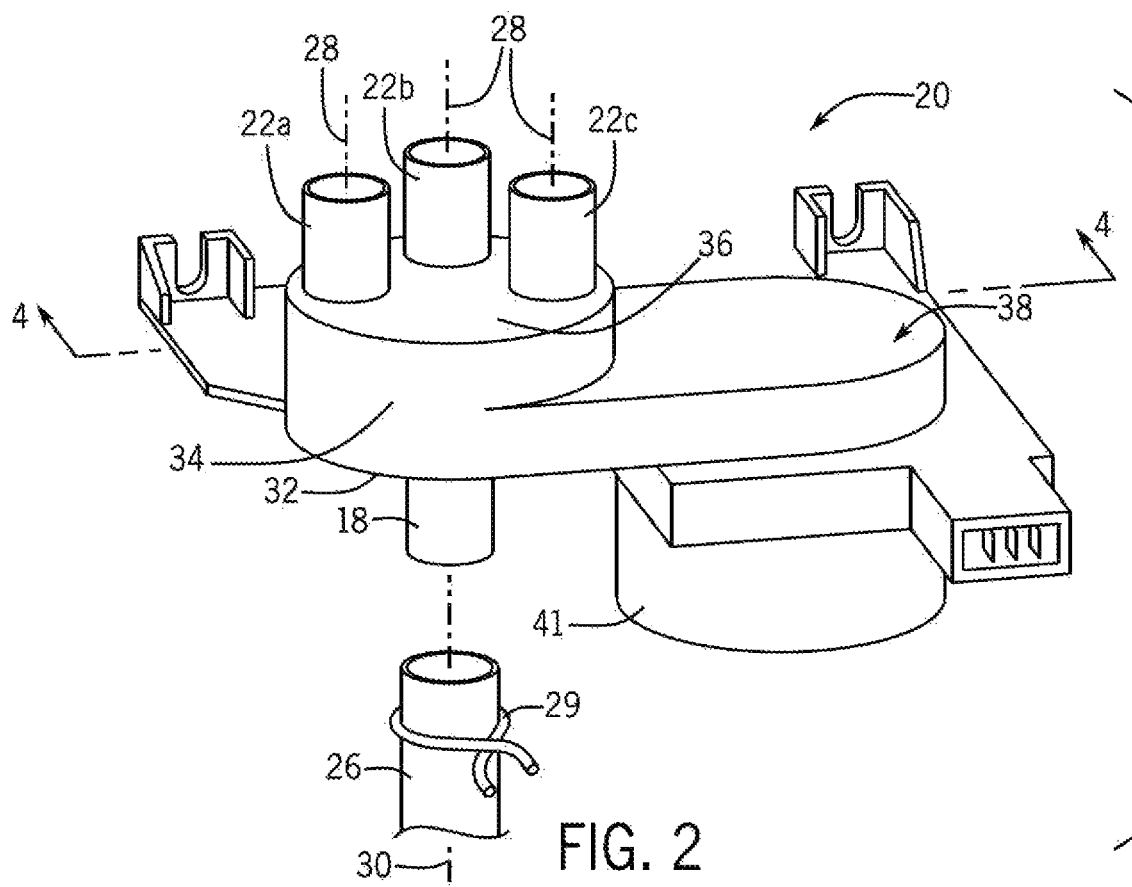
FIG. 2 is a perspective view of the diverter valve of FIG. 1 showing axially-aligned inlet and outlet pipes.

Referring now to FIG. 2, the inlet pipe 18 and outlet pipes 22a-22c of the diverter valve 20 may each provide cylindrical tubes of equally-sized inside diameters and outside diameters, the former and the latter adapted to receive interconnecting hoses 26 or the like retained thereon with spring clamps 29. In this regard, the outlet pipes 22 may be spaced apart to provide clearance for an interconnecting hose 26 placed over the outlet pipes 22.

The central axes 28 of the outlet pipes 22a-22c may be generally parallel to the Central axis 30 of the inlet pipe 18 and the central axes 28 distributed along a constant radius around the central axis 30 by equal angles of separation (120 degrees) or by 90 degree increments as shown. Generally, the central axes 28 of each of the outlet pipes 22a-22c will be displaced perpendicularly to that axes 28 from the axis 30 by an amount ranging between one half of the outside diameter of the outlet pipes 22a-22c to two times the outside diameter of the outlet pipes 22a-22c with a preferred displacement of substantially one outside diameter of the outlet pipes 22a-22c, such range minimizing the necessary angular diversion of an interconnecting passageway 48 as will be discussed.

The inlet pipe 18 will be attached to a lower face 32 of a spool housing 34 of the diverter valve 20 with the outlet pipes 22a-22c attached on an opposite, upper face 36 of the spool housing 34. The inlet pipe 18 and outlet pipes 22a-22c provide passageways in communication with the volume contained within the spool housing 34, the latter of which is generally watertight. The spool housing 34 may extend laterally away from the axis 30 of the inlet pipe 18 to provide a drive gear portion 38, which will be discussed, holding a gear communicating with an electric motor 41 serving to operate the diverter valve 20.

Figure 3:
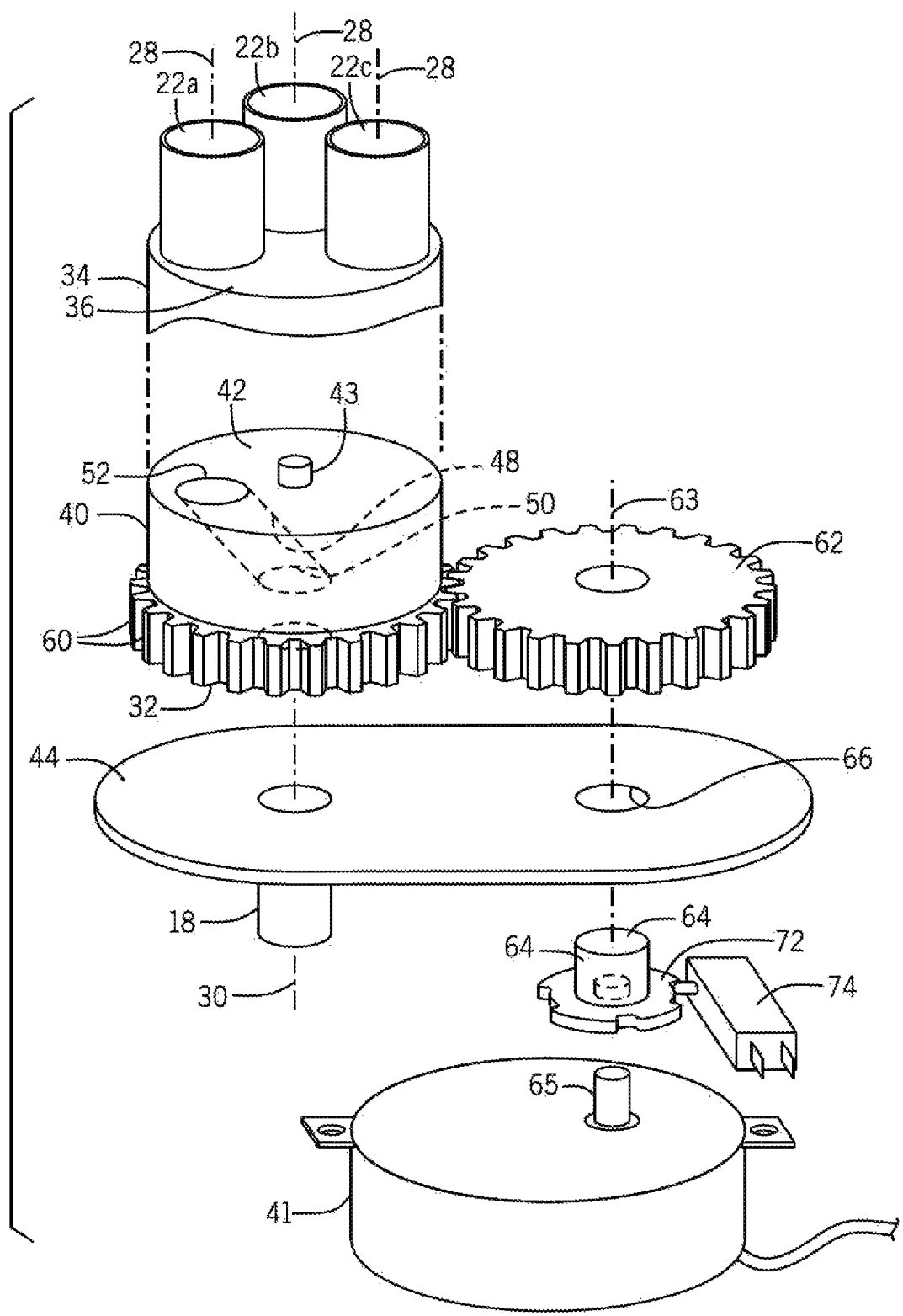
FIG. 3 is a partially exploded and fragmentary view of the diverter valve showing the internal valve spool and drive mechanism as driven by a motor.
Figure 4:
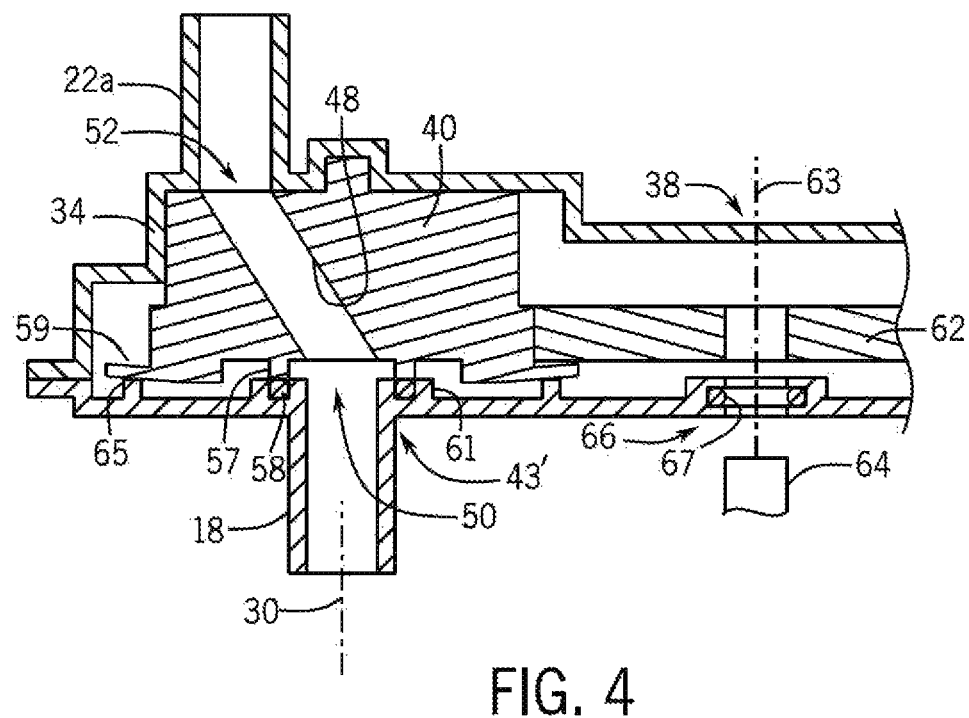
FIG. 4 is a cross-sectional view along line 4-4 of FIG. 2 showing the continuous passageway through the valve spool between an inlet and outlet.

Referring now to FIGS. 3 and 4, positioned within the spool housing 34 between the inlet pipe 18 and the outlet pipes 22a-22c is a generally cylindrical valve spool 40 having a cylinder axis aligned with axis 30 and supported to rotate about axis 30. The valve spool 40 has a planar upper base 42 substantially proximate with the outlet pipes 22a-22c and providing a sliding interface with an adjacent planar inner surface of the spool housing 34 communicating with the outlet pipes 22a-22c. The planar upper base 42 includes a pivot shall 43 that will fit within a corresponding socket in the adjacent planar inner surface of the spool housing 34 aligned along axis 30. In an alternative embodiment (not shown), the pivot shaft 43 may extend downwardly from the lower surface of the upper face 36 to be receive by a socket in the planar upper base 42 for identical function.)

The valve spool 40 also has a lower base 44 substantially proximate with the inlet pipe 18 and providing for downwardly extending ring-shaped rim 57 fitting within a corresponding ring-shaped channel 61 surrounding the inlet pipe 18 as it enters the housing 34 and opening upward from an adjacent lower face of the spool housing 34. The ring-shaped channel 61 holds an o-ring 58. Inter-engagement of the ring-shaped rim 57 and the ring-shaped channel di provide a second effective pivot point 43' working with pivot shaft 43 to pivotably support the valve spool 40 at opposite ends along axis 30 without interfering with water flow through the inlet pipe 18 sealing this connection by compression of the o-ring 58.

The valve spool 40 includes a central interconnecting passageway 48 having a central opening 50, centered within the rim 57 on the lower base 44 of the valve spool 40 aligned with the inner diameter of the inlet pipe 18. The central interconnecting passageway 48 passes through the valve spool 40 to an offset opening 52 on the planar upper base 42 of the valve spool offset from the axis 30 to be rotatably alignable with any one of the inner diameters of an outlet pipe 22 (here shown positioned at outlet pipe 22a). Rotation of the valve spool 40 will thus allow connection between the inlet pipe 18 and any one, of the outlet pipes 22a-22c.

A close sliding interface is provided between the upper base 42 of the valve spool 40 and the upper face 36 of the spool housing 34 supporting the outlet pipes 22a-22c limiting leakage of water therethrough. Each of these interface surfaces may be a polymer material to provide for self-lubrication but need not include any gasketing.

Figure 6:
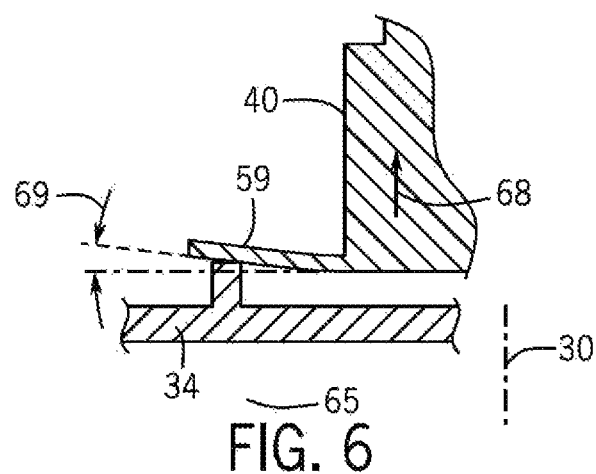
FIG. 6 is a fragmentary expansion of a bottom flange on the valve spool such as provides elastic upward biasing.

Referring momentarily to FIG. 6, a lower edge of the valve spool 40 may have a radially-extending flange 59 that during assembly of the valve spool 40 into a housing 34 is flexed Upward by deflection amount 69 by interaction with an upwardly extending rib 65 on the lower face 32 of the housing 34. This flexure, combined with the natural elasticity of a thermoplastic material, provides an upward force 68 that serves to promote the seal between the interface between the upper base 42 of the valve spool 40 (shown in FIG. 4) and the upper face 36 of the spool housing 34. This flange will also provide some "sealing" between the valve spool and housing, and in some embodiments may eliminate the need fur the o-ring 58. Referring again to FIG. 4, interconnecting passageway 48 will have a cross-section equal to the projection of the circular openings of the pipes 18 and 22 at the angle of the interconnecting passageway 48 with respect to the axis 30 so that the interconnecting passageway 48 may firm a miter joint with the openings of the pipes 18 and 22 minimizing unnecessary bends in the interconnecting passageway 48 which may be, in one embodiment, substantially straight. Interconnecting passageway 48 has a generally constant cross-section and thus eliminates dead zones or projections that could trap or snag filamentous materials passing therethrough. For similar reasons, the walls of the interconnecting passageway 48 will be generally smooth. In between the offset opening 52 and the central opening 50, the amount of angular deviation in the central axis 30 of the interconnecting passageway 48 will be generally minimized so that the cumulative magnitude of changes in angular deviation will be minimized, for example, avoiding 90-degree or 180-degree bends. Generally, too, the rate of angular deviation with progression along the interconnecting passageway 48 will also be minimized (effectively maximizing the radius of curvature of any bend or diversion).

Referring still to FIGS. 3 and 4, an outer periphery of a lower end of the valve spool 40 may provide for radially-extending spur gear teeth 60 such as allow engagement with corresponding teeth of pinion gear 62 mounted adjacent to the lower portion of the valve spool 40 in the drive gear portion 38. The pinion gear 62 is positioned so that the pinion gear 62 may rotate about an axis 63 parallel with axis 30 so as to rotate the valve spool 40 about the axis 30.

The pinion gear 62 may receive a shaft 64 through an opening 66 in the lower face 32 of the housing 34 aligned with axis 63. As shown in FIG. 4, this opening 66 may support an o-ring seal 67 allowing the shalt 64 to pass through the opening 66 and rotate therein without compromising the water-tight seal of the housing 34. In this way, an external motor 41 attached to the shaft 64 by motor shaft 65 may allow the valve spool 40 to be rotated by the motor 41 to move the offset opening 52 among the various outlet pipes 22a-22c, for example, by command from the appliance controller 21. The pinion gear 62 may be the same size as the gear formed by the valve spool 40 providing a 1:1 ratio.

Figure 5:
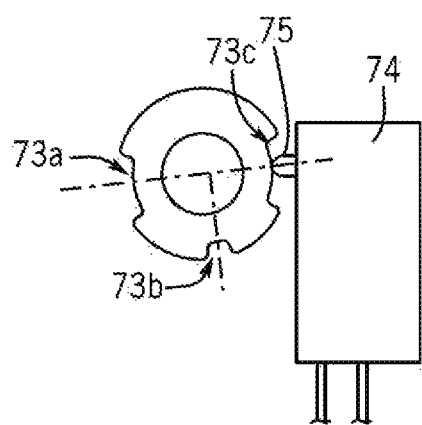
FIG. 5 is a bottom plan view of a rotary switch cam providing indications of valve spool position for closed loop control.

Referring now to FIGS. 3-5, attached to a portion of the shaft 64 outside of the housing 34 is a position sensor 70 formed from a cam disk 72 and an electrical micro-switch 74 having a plunger 75 activated by surfaces of the cam disk 72 to open and close electrical contacts. Referring now to FIG. 5, the cam disk 72 may have three cam elements 73a-73c (portions of reduced radius) separated by 90 degrees about axis 63. Activation of the micro-switch 74 by the cam elements 73 may thus be used to determine the position of the spool 40. Specifically, the position of the offset opening 52 as aligned with any of the outlet pipes 22a-22c can be determined by monitoring successive activations of the micro-switch 74 with clockwise rotation of the cam disk 72 (as shown in FIG. 5) with the extended rotators, and the difference between positions 73a and 73c is used to provide an absolute rotation reference resetting the counter used to track position with respect to the alignment position of the valve spool 40.

Alternatively, an absolute encoder may be employed in this way, for example, providing multiple bits of position sensing.

Signals from the micro-mitch 74 may be provided to the controller 21 so that control of the motor 41 may be started and stopped in a closed-loop fashion to provide appropriate alignment of the valve spool 40 with different of the outlet pipes 22 for different diverter functions.

Generally, the elements of the diverter valve 20 may be constructed of molded thermoplastic material azar molded elastomers for resistance to corrosion and the like. The motor 41 may be a DC motor or asynchronous AC motor or other similar motor types and may be bidirectional or unidirectional. Preferably, however, the motor is an AC synchronous motor with an internal gear train limiting it to a speed of approximately 4 revolutions per minute.

As used herein, substantially means operatively equivalent and, quantitatively, a value range typically deviating by less than plus or minus 5 percent and ideally plus or minus less than one percent. The term "spool" is intended to encompass any rotating structure.

Although the diverter valve has been described specifically with respect to a washing machine, it has application in a variety of appliances including a heat pump dryer where the diverter valve can change the path of condensed water from flowing to a drain to a path of flowing to a tank that may later be emptied. The ability to discharge condensed water into a tank allows the heat pump dryer to be used in environments where access to a drain is not available. As is generally understood in the art, a heat pump dryer provides a drum for tumbling wet clothing as air is circulated over the clothing by a fan. The heat pump dryer uses a heat pump to provide a hot thermal source and cold thermal sink. The hot thermal source creates heat to heat the circulated air as it is passed over the clothing being tumbled so that the air absorbs moisture. The cold thermal sink is used to condense water from the heated air after it has absorbed moisture and has passed out of the drum to condense that moisture along a path controlled by the diverter valve.

Various features of the invention are set forth in the following claims. It should be Understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. An appliance diverter water valve for pumping water having filamentous contaminants, the diverter water valve comprising:
    a housing defining an enclosed volume and having:
        an inlet-side wall with an inlet channel for receiving water and aligned along an inlet axis;
        an outlet-side wall with multiple outlets extending from the housing and providing multiple outlet channels aligned along axes parallel to the inlet axis;
    a spool positioned in the housing between the inlet channel and the multiple outlet channels to rotate about the inlet axis, the spool having:
        a spool body with a spool inlet end and a spool outlet end;
        a tubular spool channel having a first end at the spool inlet end aligned with a proximate end of the inlet channel and a second end at the spool outlet end that is aligned with individual proximate ends of the multiple outlets as the spool rotates;
        wherein the spool inlet end is proximate to and biased away from the housing inlet-side wall to provide an engagement between the spool outlet end and the housing outlet-side wall;
    an electric motor operating to rotate the spool; and
    a position sensor distinguishing a position of the second end of the spool channel alignment with individual proximate ends of the multiple outlet channels;
    wherein the spool channel when aligned with a proximate end of a given outlet channel of the multiple outlet channels provides inner channel walls that are substantially continuous with inner walls of the inlet channel and inner channel walls of the given outlet channel.

2. The appliance diverter water valve of claim 1 wherein the spool channel is free from bends of 90 degrees or greater and has a substantially constant cross-sectional area.

3. The appliance diverter water valve of claim 2 wherein the spool channel is substantially straight.

4. The appliance diverter water valve of claim 3 wherein the inlet channel has circular cross-section and the spool channel has an ellipsoidal cross-section being a projection of the circular cross-section of the inlet channel and multiple outlet channels at an angle of the spool channel.

5. The appliance diverter water valve of claim 4 wherein the inlet channel and multiple outlet channels have identical circular cross-sections.

6. The appliance diverter water valve of claim 1 further including an elastomeric seal rotatably connecting the inlet channel to the spool channel.

7. The appliance diverter water valve of claim 6 wherein the elastomeric seal fits within a circular channel centered on the inlet axis and receives a corresponding circular ridge extending downward from the spool to provide a pivot.

8. The appliance diverter water valve of claim 6 wherein an upper surface of the spool abuts a plate supporting the multiple outlet channels to provide a sliding seal against the plate with rotation of the spool and wherein the spool is elastically biased upward into sealing configuration with the plate.

9. The appliance diverter water valve of claim 8 wherein an interface between the upper surface of the spool and the plate is free from elastomeric seals.

10. An appliance diverter water valve for pumping water having filamentous contaminants, the diverter water valve comprising:
    a housing defining an enclosed volume and having an inlet channel for receiving water and aligned along an inlet axis and having multiple outlet channels aligned along axes parallel to the inlet axis;
    a spool positioned in the housing between the inlet channel and the multiple outlet channels to rotate about the inlet axis, the spool having a tubular spool channel having a first end aligned with a proximate end of the inlet channel and a second end aligned with individual proximate ends of the multiple outlets as the spool rotates;
    an electric motor operating to rotate the spool; and
    a position sensor distinguishing a position of the second end of the spool channel alignment with individual proximate ends of the multiple outlet channels;
    an elastomeric seal rotatably connecting the inlet channel to the spool channel;
    wherein:

the spool channel when aligned with a proximate end of a given outlet channel of the multiple outlet channels provides inner channel walls that are substantially continuous with inner walls of the inlet channel and inner channel walls of the given outlet channel an upper surface of the spool abuts a plate supporting the multiple outlet channels to provide a sliding seal against the plate with rotation of the spool and the spool is elastically biased upward into sealing configuration with the plate;

an interface between the upper surface of the spool and the plate is free from elastomeric seals; and the spool includes a radially-extending flange deflected upward by a rim on the housing to provide an elastic biasing upward of the spool against the plate in sealing configuration.

11. The appliance diverter water valve of claim 1 wherein at least a portion of the spool is substantially cylindrical and has an outer rim presenting radially-extending gear teeth engaging with a second gear within the housing attached to a motor outside of the housing and having a shaft extending into the housing.

12. The appliance diverter water valve of claim 11 wherein the housing provides a watertight chamber between the inlet channel and the multiple outlet channels with an opening providing a communication between the motor and the gear sealed by an inter-fitting between a gear shaft and the housing through an elastomeric seal.

13. The appliance diverter water valve of claim 12 wherein the shaft supports a cam outside of the housing interacting with a limit switch to provide the position sensor.

14. The appliance diverter water valve of claim 1 wherein the motor is an AC synchronous gearmotor.

15. The appliance diverter water valve of claim 1 wherein the housing, inlet channel, multiple outlet channels and spool are constructed of a thermoplastic.

16. The appliance diverter water valve of claim 1 further including an appliance selected from the group consisting of a dishwashing machine and a clothes washing machine wherein the diverter valve provides a conduction of water and filamentous contaminants through the appliance.

17. A washing appliance comprising:
a chamber for water and items to be washed of a type producing filamentous contaminants;
a pump communicating with the chamber for pumping water; and
a diverter valve controlling flow through the washing appliance so that water introduced into the chamber may be removed from the chamber during a draining operational state or recirculated back into the chamber during a recirculating operational state, the diverter valve having:
(1) a housing with interconnected walls including an inlet-side wall and an outlet-side wall and defining an enclosed volume and having an inlet channel at the inlet-side wall for receiving water and aligned along an inlet axis and having multiple outlet channels at the outlet-side wall aligned along axes parallel to the inlet axis to extend generally perpendicularly away from the outlet-side wall;
(2) a spool positioned in the housing between the inlet channel and the multiple outlet channels to rotate about the inlet axis, the spool having a tubular spool channel having a first end aligned with a proximate end of the inlet channel and a second end aligned with individual proximate ends of the multiple outlets as the spool rotates and wherein alignment of the inlet channel and at least one of the outlet channels directs the water from the respective outlet channel back to the chamber during the recirculating operational state;
(3) an electric motor operating to rotate the spool; and
(4) a position sensor distinguishing a position of the second end of the spool channel alignment with individual proximate ends of the multiple outlet channels;
wherein the spool channel when aligned with a proximate end of a given outlet channel of the multiple outlet channels provides inner channel walls that are substantially continuous with inner walls of the inlet channel and inner channel walls of the given outlet channel, and
wherein the washing appliance further includes:
a drain conduit with a first end connected to the chamber and a second end connected to the pump to deliver the water from the chamber to the pump; and
an outlet pipe with a first end connected to the diverter valve and a second end connected to the chamber to deliver the water from the diverter valve into the chamber during the recirculating operational state.

18. A method of washing items producing filamentous contaminants comprising the steps of:
(1) placing the items in a wash chamber;
(2) pumping water out of the wash chamber through a diverter valve of a type having:
(a) a housing defining an enclosed volume and having an inlet channel for receiving water and aligned along an inlet axis and having multiple outlets extending from a wall of the housing and providing multiple outlet channels aligned along axes parallel to the inlet axis;
(b) a spool positioned in the housing between the inlet channel and the multiple outlet channels to rotate about the inlet axis, the spool having a tubular spool channel having a first end aligned with a proximate end of the inlet channel and a second end aligned with individual proximate ends of the multiple outlets as the spool rotates;
(c) an electric motor operating to rotate the spool;
(d) a position sensor distinguishing a position of the second end of the spool channel alignment with individual proximate ends of the multiple outlet channels;
wherein the spool channel when aligned with a proximate end of a given outlet channel of the multiple outlet channels provides inner channel walls that are substantially continuous with inner walls of the inlet channel and inner channel walls of the given outlet channel; and
(3) operating the diverter valve to change a path of water from the wash chamber between (i) returning directly to the wash chamber during a recirculating operational state defining a recirculating flow path in which water from the wash chamber is delivered through the diverter valve and an outlet pipe that connects the diverter valve to the wash chamber, wherein the outlet pipe includes an inlet end that is connected to and receives the water from the diverter valve and an outlet end that delivers the water into the wash chamber during the recirculating operational state, (ii) flowing through an additive chamber and then returning to the wash chamber, or (iii) diverting away from the wash chamber and exiting the appliance.

19. The appliance diverter water valve of claim 1, further comprising:
a rib that extends from an inner surface of the housing inlet-side wall; and a flange is arranged at the spool inlet end and engages and is deflected by the rib to bias the spool toward the housing outlet-side wall.

\* \* \* \* \*